Dec. 31, 1963 W. H. COWLES ETAL 3,115,750
TURBINE ENGINE MAXIMUM SPEED LIMITER
Filed Jan. 16, 1961 2 Sheets-Sheet 1
Fig. 1·A
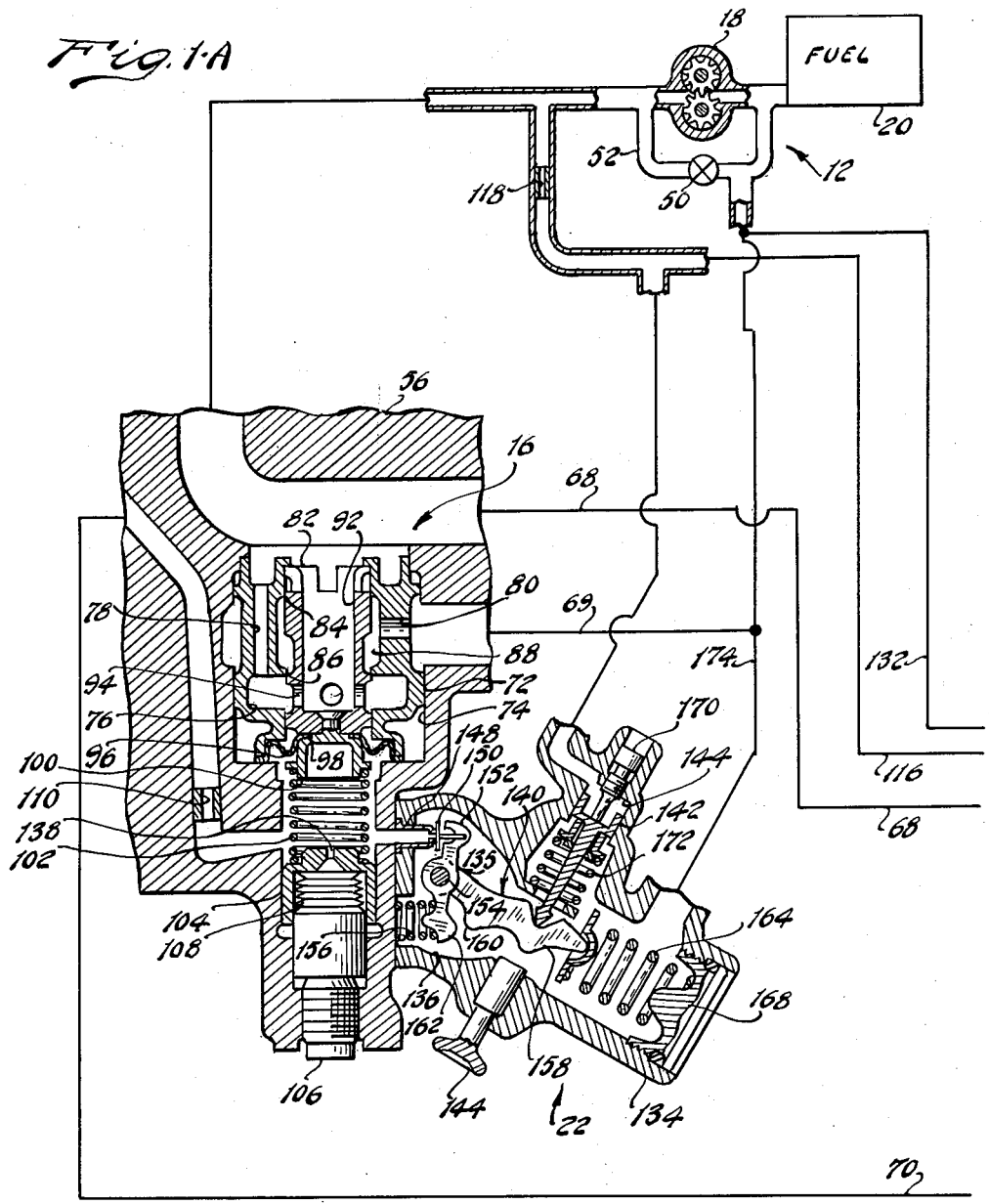
INVENTORS.
WARREN H. COWLES.
BY RAYMOND L. ENSINGER
Whittemore Hulbert & Belknap
ATTORNEYS.

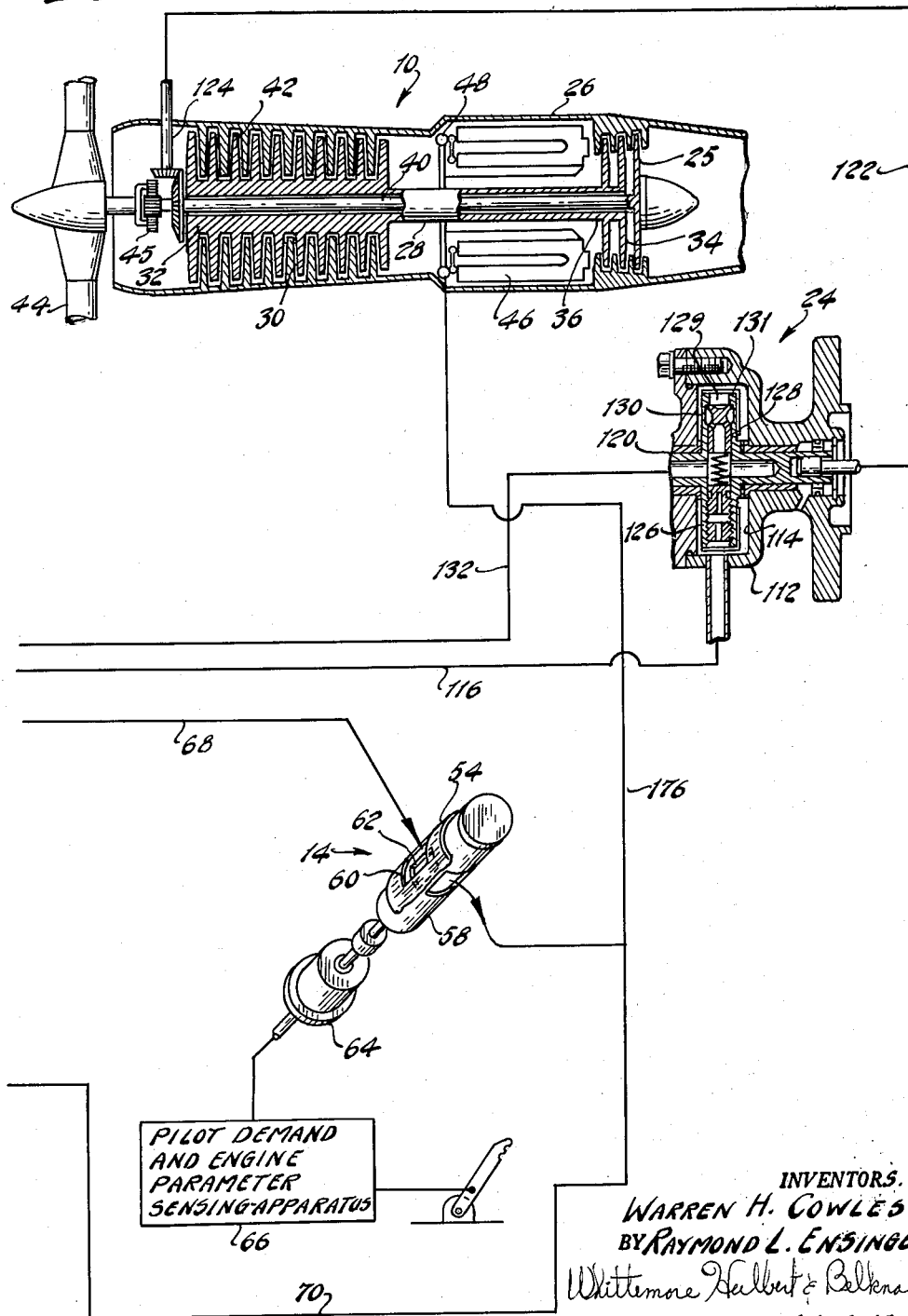

United States Patent Office 3,115,750
Patented Dec. 31, 1963

3,115,750
TURBINE ENGINE MAXIMUM SPEED LIMITER
Warren H. Cowles and Raymond L. Ensinger, Detroit, Mich., assignors to Holley Carburetor Company, Warren, Mich., a corporation of Michigan
Filed Jan. 16, 1961, Ser. No. 82,866
13 Claims. (Cl. 60—39.16)

The invention relates to governors and refers more specifically to fuel metering apparatus for use with turbine engines employing free turbines operable to terminate fuel flow to the engine at a predetermined free turbine speed to maintain the free turbine speed below the critical speed thereof.

In many instances it is desirable to meter fuel to an engine while the speed of the engine components is below a predetermined speed and to completely cut off the fuel flow to the engine if the speed of an engine component exceeds a predetermined speed. This is especially true in the case of turbine engines wherein free turbines are employed since the fuel metered to the engine in accordance with the usual parameters, such as compressor speed, temperature, pressure and pilot request may produce free turbine speeds which exceed the critical speed thereof which excessive free turbine speeds are likely to extensively damage the engine.

Devices for regulating the maximum speed of turbine engine components should be light weight for use in aircraft wherein turbine engines are presently used and should be as simple as possible so that the reliability thereof is increased and their cost kept to a minimum.

It is therefore one of the objects of the present invention to provide improved fuel metering apparatus for limiting the maximum speed of engine components.

Another object is to provide improved means for metering fuel to turbine engines or similar devices employing a free turbine in accordance with parameters, such as speed, temperature, pressure and operator request below a predetermined speed and for cutting off the fuel to the engine at free turbine speeds above a predetermined free turbine speed.

Another object is to provide fuel metering apparatus for a turbine engine or similar device employing a free turbine comprising a fuel pump and a metering valve in series between a fuel storage tank and the fuel manifold of the engine, a bypass valve assembly between the fuel pump and the fuel storage tank operable in response to a predetermined pressure differential across the metering valve to bypass fuel from the fuel pump back to the fuel tank, a speed sense for sensing the speed of the free turbine of the engine and a speed limiting device operable in response to a particular speed sensed by the speed sense to completely open the bypass valve at a predetermined critical free turbine speed whereby all of the fuel pumped by the fuel pump is returned through the bypass valve to the fuel tank and no fuel is metered through the metering valve to the engine.

Another object is to provide fuel metering apparatus as set forth above wherein the bypass valve assembly comprises a conduit in communication with the fuel pump, a second conduit in communication with the engine fuel manifold side of the metering valve and a valve member positionable between the first and second conduits in accordance with the difference in the fuel pressure in the conduits operable to bypass progressively more of the pumped fuel to the fuel tank on increase of pressure difference across the valve member.

Another object is to provide fuel metering apparatus as set forth above wherein the speed limiting device comprises a snap acting lever operable to open a servo-valve and connect the engine fuel manifold side of the bypass valve assembly valve member to the fuel tank, on actuation thereof and means responsive to the speed sense to actuate the lever at a predetermined engine speed.

Another object is to provide fuel metering apparatus as set forth above which is simple in construction, economical to manufacture and efficient in use.

Other objects and features of the invention will become apparent as the description proceeds, especially when taken in conjunction with the accompanying drawing, illustrating a preferred embodiment of the invention, wherein:

The FIGURE comprising two portions, 1a and 1b, respectively is a diagrammatic representation of speed limiting apparatus constructed according to the invention.

With particular reference to the figure, one embodiment of the present invention will now be disclosed.

The fuel metering apparatus, illustrated in the figure, comprises the turbine engine 10 and fuel supply apparatus 12 for supplying fuel at a substantially constant pressure to the metering valve 14 positioned between the fuel supply apparatus 12 and the engine 10 as shown. A bypass valve 16 is also provided to bypass fuel pumped by the pump 18 of the fuel supply apparatus 12 back to the fuel storage tank 20 thereof in accordance with the pressure differential across the metering valve 14.

In accordance with the invention a speed limiting device 22 and speed sensor 24 are also provided in conjunction with the bypass valve 16. The speed limiting device 22 is provided to operate the bypass valve 16 to cause all the fuel pumped by pump 18 to be bypassed back to the fuel tank 12 so that no fuel will be metered through the metering valve 14 to the engine 10 in response to a predetermined engine speed sensed by speed sensor 24.

Thus in operation, the fuel metered to the turbine engine 10 is controlled in accordance with the usual parameters of speed, temperature, pressure and pilot request by the metering valve 14 until the free turbine 25 of the engine 10 reaches a predetermined maximum speed. After the free turbine 25 reaches the predetermined maximum speed the speed limiting device is operated in response to the speed sense 24 to cut off the fuel supply of the engine 10, thereby keeping the speed of the free turbine below the turbine critical speed.

More specifically the turbine engine 10 includes the body 26 having the hollow shaft 28 mounted axially thereof as shown. The compressor 30 is mounted on end 32 of shaft 28 while the turbine 34 for driving the compressor 30 is mounted on the other end 36 of the shaft 28. The free turbine 25 is also a part of the engine 10 and is mounted for rotation on the shaft 40 extending axially of the hollow shaft 28 as shown. The end 42 of the shaft 40 is connected to the propeller or fan 44 through drive means 45.

The turbine engine 10 is further provided with the burner chamber 46 between the compressor 30 and the turbines 25 and 34. Fuel manifold 48 is positioned adjacent the burner chamber 46 to inject fuel thereinto whereby rotation of the turbines 25 and 34, compressor 30 and propeller 44 is effected on burning of the fuel.

As previously indicated the speed of the turbine engine 10 may be controlled by metering fuel to the fuel manifold 48. Further the speed of the free turbine 25 may be kept below a predetermined critical speed above which the engine will be damaged by cutting off the fuel metered to the fuel manifold 48.

Fuel supply system 12 includes the fuel storage tank 20 for storing the fuel necessary for operation of the turbine engine 10 and a pump 18 for continually pumping a quantity of fuel from the fuel tank 20 in excess of engine demands. The pressure at the output side of the pump 18 is kept substantially constant by the constant pressure valve 50 inserted in fuel conduit 52 connected to bypass the pump 18 as shown.

The fuel supplied to the turbine engine 10 by the fuel supply apparatus 12 is metered by the fuel metering valve 14 as previously indicated. Fuel metering valve 14 is comprised of a sleeve 54 which may be retained within a general housing 56 and a movable inner valve member 58 which is both axially and angularly positionable within the sleeve 54. The sleeve 54 includes a plurality of rectangular openings 60 therethrough while the inner valve member 58 includes a plurality of rectangular openings 62 extending therethrough. The openings 60 and 62 cooperate to produce metering ports through the metering valve 14 of different effective area on either axial or rotational relative movement between the sleeve 54 and the inner valve member 58.

The motor means 64 shown in the figure effects both axial and angular relative movement between the sleeve 54 and inner valve member 58 in accordance with control parameters such as pilot request, temperature, speed and pressure sensed by the parameter sensing apparatus 66. Thus the speed of the turbine engine 10 may be regulated by relative positioning of the sleeve 54 and inner valve member 58 to meter the fuel pumped to the engine 10 under pressure from the fuel supply apparatus 12.

The fuel input to the bypass valve 16 is from the conduit 68 between the output side of the pump 18 and the metering valve 14. All the fuel pumped by pump 18 is discharged from the valve 16 to the fuel tank side of the pump 18 through conduit 69 when valve 16 is fully open. A fuel conduit 70 is further provided from the outlet side of the metering valve 14 to the bypass valve 16 to provide an operating pressure difference therefor as will be considered subsequently.

Bypass valve 16 includes the sleeve 72 within the recess 74 in the housing 56. Sleeve 72 includes the annular interior chamber 76 as shown and the axial passages 78 extending from the conduit 68 into the chamber 76. The passages 78 alternate angularly of the sleeve 72 with the transverse passages 80 extending through the sleeve 72 as shown.

Valve member 82 is mounted for reciprocal movement within the sleeve 72 as shown in the figure. Valve member 82 seats against valve seats 84 and 86 on sleeve 72 to prevent passage of fuel into the chamber 88 formed between the valve member and sleeve when the valve member is in the seated position as shown in the figure. Thus when the valve 82 is in the position shown in the figure fuel will not be bypassed from the conduit 68 through the valve 82 into the chamber 88 through passages 80 and back to the fuel storage tank 20 through conduit 69 and bypass conduit 52.

The path of the fuel through the valve 82 from the conduit 68 may be through the passages 78, the annular chamber 76, past the valve seat 86, and into chamber 88. Simultaneously the path of the fuel through the valve 82 may be through the central passage 92 of the valve 82, the transverse openings 94 into the chamber 76, past the valve seat 86, and into the chamber 88 or directly from the conduit 68, past the valve seat 84 into the chamber 88 when the valve 82 is in an unseated position.

Movement of the valve 82 in accordance with the pressure differential between the input and output conduits 68 and 70 of the fuel metering valve is accomplished by means of the diaphragm 96. The diaphragm is secured to the valve 82 around the inner periphery 98 of the diaphragm 96 by means of the spring retainer cup 100 secured to the valve 82 by convenient means as shown. The outer periphery of the diaphragm 96 is sealed between the housing 56 and the sleeve 72 as shown. The valve 82 is urged in its upper or seated position, as shown in the figures, by means of the spring 102 positioned between the spring retainer cups 100 and 104.

The spring retainer cup 104 is adjustable axially of the valve 82 by means of the adjustable abutment 106 to regulate the amount of fuel bypassed back to the fuel tank 20 through conduits 69 and 52 from conduit 68 due to a given pressure differential between the input conduit 68 and the output conduit 70 of the metering valve 14. Thus the effect of engine parameter and pilot request signals on the fuel metered to the engine may be adjusted by the adjustable abutment 106.

The effect of temperature on the fuel metering system is further compensated for by means of the thermostatic elements 108 in conjunction with the adjustable abutment 106 which act to position the valve 82 axially in accordance with temperature changes in conjunction with the spring 102.

Thus in operation of the bypass valve 16, as the pressure differential between the conduits 68 and 70 at the input and output of the metering valve 14 increases, the pressure in the conduit 70 will be felt at the diaphragm 96 through the restricted orifice 110 to produce downward movement of the valve 82 within sleeve 72 so that a larger part of the fuel pumped by the pump 18 will be bypassed back to the fuel storage tank to reduce the pressure in the conduit 68.

The speed sense 24 as shown in the figure comprises a housing 112 which may be part of general housing 56 including a chamber 114. A conduit 116 extends from the output side of the pump 18 to the chamber 114 and is provided with a restricting orifice 118 therein as shown. A hollow shaft 120 is mounted for rotation in the housing 112 and is driven by a transmission 122 coupled to the rotating shaft 42 by the coupling means 124. Thus the hollow shaft 120 rotates at a speed proportional to the speed of the free turbine 25 of the engine 10.

The hollow shaft 120 is provided with hollow cross arms 126 having a spring biased valve 128 therein operable to permit fuel from chamber 114 to enter into the hollow cross arms and shaft 120 through opening 129 in end 131 of cross arms 126 and ports 130 in valve 128 at rotational speeds of the shaft 120 below a predetermined speed. As the speed of the engine 10 approaches the predetermined speed the valve 128 is forced radially outwardly by centrifugal force to close the valve 128 and prevent entry of fuel into the hollow shaft 120. A conduit 132 is provided between the hollow shaft 120 and the fuel storage tank 20 as shown.

Thus in operation of the speed sense 24 as the free turbine 25 of the turbine engine 10 rotates the shaft 120 is rotated to gradually restrict the flow of fuel from the conduit 116 through the speed sense and back to the fuel tank 20. When the speed of the free turbine 25 of engine 10 reaches a predetermined speed the valve 128 is entirely closed so that the pressure in the conduit 116 builds up to a pressure substantially equal to the output pressure of the pump 18 from some pressure substantially below the output pressure of pump 18 due to the restricted orifice 118 in the conduit 116 and the prior flow of fuel through conduit 132. Presence of pressure substantially equal to the output pressure of the pump 18 in conduit 116 actuates the speed limiting device 22.

The speed limiting device 22 comprises the housing 134 which also may be a part of the general housing 56, a servo-valve 135 between the chamber 136 in the housing 134 and the chamber 138 in the housing 56, lever actuating means 140 for servo-valve 135 in chamber 136 and piston means 142 for moving the lever actuating means 140 in accordance with the pressure in the conduit 116. Manual reset means 144 is also provided in conjunction with the speed limiting device 22 as shown.

The servo-valve 135 between the chambers 136 and 138 includes the valve seat 148 extending therebetween and the movable valve head 150 operable to close against the valve seat 148 to seal the chamber 136 from the chamber 138. The valve head 150 is secured to lever 152 which is pivotally mounted on the housing 134 by pivot pin 154. The lever 152 is urged in a direction about the pivot pin 154 to maintain the valve head 150 in a closed position by means of spring 156.

Mounted on pivot pin 154 and movable independently of the lever 152 is a second lever 158 having the projection 160 thereon engageable with the abutment 162 on lever 152 to cause clockwise rotation of the lever 152, as shown in the figure, and unseating of the valve head 150. The lever 158 is urged in a counterclockwise direction as shown in the figure by the spring 164 positioned between the spring caps 166 and 168. Lever 158 is pivotal in a clockwise direction about the pin 154 from the position shown by means of the piston 142 reciprocal in the chamber 144 within the housing 134. The piston 142 is urged against the adjustable stop 170 by means of the spring 172.

In operation of the speed limiting device 22, as the speed of the free turbine 25 of the turbine engine 10 increases the pressure in conduit 116 will also increase due to the action of the speed sense 24 previously considered and when a predetermined speed is reached the pressure in the conduit 116 will be such that the piston 142 will be moved away from the adjustable stop 170 against the bias of the spring 172 a sufficient distance to move the lever 158 over center of the pivot pin 154. The spring 164 will then cause the lever 158 to snap in a clockwise direction to abut against the reset button 144. Contact is thus made between the abutments 160 and 162 to open the valve 135 between the chambers 136 and 138.

The fuel in the chamber 138 is therefore connected directly to the fuel storage tank through the valve 135, the chamber 136 and conduits 174 and 52. Valve member 82 of the bypass valve 16 is therefore caused to move to a downward limiting position so that all of the fuel pumped by the pump 18 of the fuel supply apparatus 12 is bypassed back to the fuel tank 20 through low pressure conduit 69 and no fuel is metered under pressure through the metering valve 14 to the fuel manifold 48. The speed of the free turbine 25 is thus prevented from exceeding the predetermined maximum. When the speed of the turbine 25 has been lowered sufficiently below the critical speed thereof at which the engine will be damaged, the reset button 144 may be manually pressed to reset the levers 140 and 152 to the position shown in the figure.

In over-all operation, at free turbine speeds below a predetermined speed of the free turbine 25, the fuel from the fuel supply apparatus 12 is pumped through conduit 68 and metered to the fuel manifold 48 by metering valve 14 through conduit 176 in accordance with external control signals, such as temperature, pressure and pilot request from the control signal apparatus 66. If during the metering of fuel to the engine the pressure in conduit 68 differs from the pressure in the conduit 70 by an amount sufficient to produce undesirable fuel metering to the engine 10, the bypass valve assembly 16 operates to bypass more or less fuel pumped by the pump 18 back to the fuel storage tank 20 through valve 82, sleeve 72, conduit 69 and conduit 50 due to movement of valve 82 by diaphragm 96 under control of the differential pressure in the chamber 138 and conduit 68.

As the speed of the free turbine 25 of the turbine engine 10 increases the amount of fluid permitted to flow through the speed sense 24 and restricted conduit 116 back to the fuel storage tank 20 through conduit 132 is limited and at a predetermined free turbine speed is completely cut off. At this time the pressure in the conduit 116 is such that the speed limiting device operates as described above to open servo-valve 135 by means of the snap acting lever 140 in conjunction with valve carrying lever 152.

Opening of the valve 135 causes the pressure in the chamber 138 to drop so that the valve 82 is moved to its lower limiting position and all of the fuel pumped by the pump 18 is bypassed back to the fuel tank 20. Thus no fuel is metered to the fuel manifold 48 at speeds above the predetermined free turbine speed so that the speed of the free turbine is effectively maintained below the critical speed thereof. As previously indicated when the speed of the free turbine 38 is reduced below the predetermined speed the reset button 144 may be manually pressed to return the speed limiting device 22 to the condition illustrated.

The drawing and the foregoing specification constitute a description of the improved turbine engine maximum speed limiter in such full, clear, concise and exact terms as to enable any person skilled in the art to practice the invention, the scope of which is indicated by the appended claims.

What we claim as our invention is:

1. A hydraulic governor for turbine engines employing a free turbine and having a fuel supply, comprising a fuel pump having an inlet side connected to the fuel supply and an outlet side connected to the engine, a pressure regulating valve connecting the inlet and outlet side of the pump for maintaining a substantially constant pressure at the outlet side of the pump, a single fuel metering valve having input and output sides connected between the outlet side of the pump and the engine for metering a portion of the pumped fuel to the engine in accordance with a plurality of engine parameters and pilot demand, a pressure responsive bypass valve including a variable orifice in parallel with said pump for bypassing the remainder of the fuel from the outlet side of the pump to the inlet side thereof one side of which valve is connected to the input side of the metering valve, a restricted conduit connecting the other side of the bypass valve to the output side of the metering valve, a centrifugally operated hydraulic speed sensor, a restricted conduit directly connecting the output side of the pump to the speed sense, a conduit directly connecting the speed sensor to the input side of the pump to provide a complete hydraulic path through the speed sensor, and a mechanical driving connection between the speed sensor and the free turbine of the engine whereby a pressure proportional to the speed of the engine is developed by the speed sensor in the restricted conduit between the speed sensor and pump, and a snap acting servo valve connected to the restricted conduit between the speed sensor and pump responsive to the pressure proportional to engine speed for connecting the bypass valve side of the restricted conduit between the metering valve and bypass valve to the inlet side of the pump at a predetermined free turbine speed for fully opening the bypass valve whereby substantially all of the fuel pumped is returned to the inlet side of the pump and the speed of the free turbine is limited.

2. A hydraulic governor for use with turbine engines and a fuel supply therefor, comprising a pump for pumping a greater quantity of fuel from the fuel supply than required by the engine, a metering valve connected between the pump and engine for metering a portion of the pumped fuel to the engine, a pressure actuated bypass valve having a metering valve output side, an actuating diaphragm connected in parallel with the metering valve and a variable orifice in parallel with the pump for maintaining a substantially constant pressure across the metering valve and for bypassing the fuel pumped in excess of that required by the engine back to the fuel supply, a hydraulic speed sensor connected directly across the pump, means for actuating the speed sensor in accordance with the speed of the engine to develop a signal proportional to the speed of the engine, and a servo valve connected between the output side of the metering valve and the input side of the pump directly responsive to the signal proportional to speed developed by the speed sensor for connecting the metering valve output side of the bypass valve to the input side of the pump at a predetermined turbine speed and fully opening the variable orifice whereby substantially all of the fuel pumped is returned to the inlet side of the pump.

3. In a fuel supply system for a turbine engine or similar device a snap acting servo valve comprising a valve seat, pivotal mounting means adjacent the valve seat, a first lever pivotally mounted on said pivotal means, a valve secured to one end of said first lever engageable with said valve seat on pivoting of the first lever in one direction, first resilient means engaged with the other end of the first lever for biasing the first lever in said one direction to seat the valve on the valve seat, a second lever pivotally mounted at one end on the same pivotal mounting means as the first lever, a projection on said second lever engageable with said other end of the first lever on pivotal movement of the second lever in a direction opposite said one direction, over-center resilient means engaged with said second lever at the other end thereof for normally urging the second lever in said one direction and operable on said second lever being moved into an over-center position in said opposite direction to bias the second lever in said opposite direction to engage the projection on the second lever with the said other end of the first lever and pivot the first lever in said other direction to unseat the valve carried thereby in opposition to the first resilient means, and condition responsive means for moving said second lever into an over-center position in said opposite direction.

4. A snap acting servo valve as set forth in claim 3 wherein said condition responsive means is a pressure responsive piston resiliently biased away from the second lever and into engagement with an adjustable abutment.

5. A snap acting servo valve as set forth in claim 3 including means for varying the bias applied to the second lever by means of the over-center resilient means.

6. Structure as claimed in claim 3 and further including manual reset apparatus for positioning said second lever in an over-center position in said other direction whereby the valve carried by the first lever is permitted to reseat on the valve seat due to pivoting of first lever by the first resilient means.

7. A hydraulic governor for turbine engines employing a free turbine and having a fuel supply, comprising a fuel pump having an inlet side connected to the fuel supply and an outlet side connected to the engine, a pressure regulating valve connecting the inlet and outlet side of the pump for maintaining a substantially constant pressure at the outlet side of the pump, a single fuel metering valve having input and output sides connected between the output side of the pump and the engine for metering a portion of the pumped fuel to the engine in accordance with a plurality of engine parameters and pilot demand, a pressure responsive bypass valve comprising a sleeve including transverse openings therein for the discharge of fuel from the valve, a pressure responsive metering member one side of which is connected to the input side of the metering valve slidably received within said sleeve providing in conjunction with the transverse openings in said sleeve a variable orifice in parallel with said pump for bypassing the remainder of the fuel from the outlet side of the pump to the inlet side thereof, valve means integral with said sleeve and pressure responsive metering member for controlling the quantity of fuel passed through the openings in the sleeve in accordance with the axial position of the pressure responsive metering member within the sleeve, an abutment adjacent the pressure responsive metering member, resilient means operable between the abutment and pressure responsive metering member for urging the pressure responsive metering member in a direction tending to reduce the quantity of fuel passed through the opening in the sleeve, a restricted conduit connecting the other side of the metering member to the output side of the metering valve, a centrifugally operated hydraulic speed sensor, a restricted conduit directly connecting the output side of the pump to the speed sensor, a conduit directly connecting the speed sensor to the input side of the pump to provide a complete hydraulic path through the speed sensor, and a mechanical driving connection between the speed sensor and the free turbine of the engine whereby a pressure proportional to the speed of the engine is developed by the speed sensor in the restricted conduit between the speed sensor and pump, and a snap acting servo valve connected to the restricted conduit between the speed sensor and pump responsive to the pressure proportional to engine speed for connecting the bypass valve side of the restricted conduit between the metering valve and bypass valve to the inlet side of the pump at a predetermined free turbine speed for fully opening the bypass valve whereby substantially all of the fuel pumped is returned to the inlet side of the pump and the speed of the free turbine is limited.

8. Structure as claimed in claim 7 wherein said bypass valve further includes a thermostatic element operably associated with said abutment to vary the position of the abutment in accordance with temperature.

9. A hydraulic governor for turbine engines employing a free turbine and having a fuel supply, comprising a fuel pump having an inlet side connected to the fuel supply and an outlet side connected to the engine, a pressure regulating valve connecting the inlet and outlet side of the pump for maintaining a substantially constant pressure at the outlet side of the pump, a single fuel metering valve having input and output sides connected between the outlet side of the pump and the engine for metering a portion of the pumped fuel to the engine in accordance with a plurality of engine parameters and pilot demand, a pressure responsive bypass valve including a variable orifice in parallel with said pump for bypassing the remainder of the fuel from the outlet side of the pump to the inlet side thereof one side of which valve is connected to the input side of the metering valve, a restricted conduit connecting the other side of the bypass valve to the output side of the metering valve, a centrifugally operated hydraulic speed sensor, a restricted conduit directly connecting the output side of the pump to the speed sensor, a conduit directly connecting the speed sensor to the input side of the pump to provide a complete hydraulic path through the speed sensor, and a mechanical driving connection between the speed sensor and the free turbine of the engine whereby a pressure proportional to the speed of the engine is developed by the speed sensor in the restricted conduit between the speed sensor and pump, and a snap acting servo valve connected to the restricted conduit between the speed sensor and pump responsive to the pressure proportional to engine speed for connecting the bypass valve side of the restricted conduit between the metering valve and bypass valve to the inlet side of the pump at a predetermined free turbine speed for fully opening the bypass valve whereby substantially all of the fuel pumped is returned to the inlet side of the pump and the speed of the free turbine is limited, comprising a valve member, resilient means for urging the valve member in a closed direction, a snap acting lever operable to open the valve member in opposition to the resilient means when moved in one direction, and pressure responsive piston means for moving the lever in said one direction connected to the speed sensor.

10. Structure as claimed in claim 9 wherein said servo-valve means further includes manual reset means for moving said snap acting lever in a direction opposite said one direction.

11. A hydraulic governor for use with turbine engines and a fuel supply therefor, comprising a pump for pumping a greater quantity of fuel from the fuel supply than required by the engine, a metering valve connected between the pump and engine for metering a portion of the pumped fuel to the engine, a pressure responsive bypass valve comprising a sleeve including transverse openings therein for the discharge of fuel from the valve, a pressure responsive metering member one side of which is connected to the input side of the metering valve slidably received within said sleeve providing in conjunction with the transverse openings in said sleeve a variable orifice in parallel with said pump for bypassing the remainder of the fuel from the outlet side of the pump to the inlet side thereof, valve means integral with said sleeve and pressure responsive metering member for controlling the quantity of fuel passed through the openings in the sleeve in accordance with the axial position of the pressure responsive metering member within the sleeve, an abutment adjacent the pressure responsive metering member, resilient means operable between the abutment and pressure responsive metering member for urging the pressure responsive metering member in a direction tending to reduce the quantity of fuel passed through the opening in the sleeve, a restricted conduit connecting the other side of the metering member to the output side of the metering valve, a hydraulic speed sensor connected directly across the pump, means for actuating the speed sensor in accordance with the speed of the engine to develop a signal proportional to the speed of the engine, and a servo valve connected between the output side of the metering valve and the input side of the pump directly responsive to the signal proportional to speed developed by the speed sensor for connecting the metering valve output side of the bypass valve to the input side of the pump at a predetermined turbine speed and fully opening the variable orifice whereby substantially all of the fuel pumped is returned to the inlet side of the pump.

12. A hydraulic governor for use with turbine engines and a fuel supply therefor, comprising a pump for pumping a greater quantity of fuel from the fuel supply than required by the engine, a metering valve connected between the pump and engine for metering a portion of the pumped fuel to the engine, a pressure actuated bypass valve having a metering valve output side, an actuating diaphragm connected in parallel with the metering valve and a variable orifice in parallel with the pump for maintaining a substantially constant pressure across the metering valve and bypassing the fuel pumped in excess of that required by the engine back to the fuel supply, a hydraulic speed sensor connected directly across the pump, means for actuating the speed sensor in accordance with the speed of the engine to develop a signal proportional to the speed of the engine, and a servo valve connected between the output side of the metering valve and the input side of the pump directly responsive to the signal proportional to speed developed by the speed sensor for connecting the metering valve output side of the bypass valve to the input side of the pump at a predetermined turbine speed and fully opening the variable orifice whereby substantially all of the fuel pumped is returned to the inlet side of the pump comprising a valve member, resilient means for urging the valve member in a closed direction, a snap acting lever operable to open the valve member in opposition to the resilient means when moved in one direction, and pressure responsive piston means for moving the lever in said one direction connected to the speed sensor.

13. A hydraulic governor for use with turbine engines and a fuel supply therefor, comprising a pump for pumping a greater quantity of fuel from the fuel supply than required by the engine, a metering valve connected between the pump and engine for metering a portion of the pumped fuel to the engine, a pressure responsive bypass valve comprising a sleeve including transverse openings therein for the discharge of fuel from the valve, a pressure responsive metering member one side of which is connected to the input side of the metering valve slidably received within said sleeve providing in conjunction with the transverse openings in said sleeve a variable orifice in parallel with said pump for bypassing the remainder of the fuel from the outlet side of the pump to the inlet side thereof, valve means integral with said sleeve and pressure responsive metering member for controlling the quantity of fuel passed through the openings in the sleeve in accordance with the axial position of the pressure responsive metering member within the sleeve, an abutment adjacent the pressure responsive metering member, resilient means operable between the abutment and pressure responsive metering member for urging the pressure responsive metering member in a direction tending to reduce the quantity of fuel passed through the opening in the sleeve, a restricted conduit connecting the other side of the metering member to the output side of the metering valve, a hydraulic speed sensor connected directly across the pump, means for actuating the speed sensor in accordance with the speed of the engine to develop a signal proportional to the speed of the engine, and a servo valve connected between the output side of the metering valve and the input side of the pump directly responsive to the signal proportional to speed developed by the speed sensor for connecting the metering valve output side of the bypass valve to the input side of the pump at a predetermined turbine speed and fully opening the variable orifice whereby substantially all of the fuel pumped is returned to the inlet side of the pump comprising a valve member, resilient means for urging the valve member in a closed direction, a snap acting lever operable to open the valve member in opposition to the resilient means when moved in one direction, and pressure responsive piston means for moving the lever in said one direction connected to the speed sensor.

References Cited in the file of this patent

UNITED STATES PATENTS

| 1,735,197 | Christensen | Nov. 12, 1929 |
| 2,340,454 | Conde | Feb. 1, 1944 |
| 2,712,427 | Welborn | July 5, 1955 |
| 2,841,957 | Thorpe | July 8, 1958 |
| 2,848,869 | Russ | Aug. 26, 1958 |
| 2,939,280 | Farkas | June 7, 1960 |
| 2,986,126 | Werts | May 30, 1961 |

FOREIGN PATENTS

| 824,752 | Great Britain | Dec. 2, 1959 |